Figure 1:
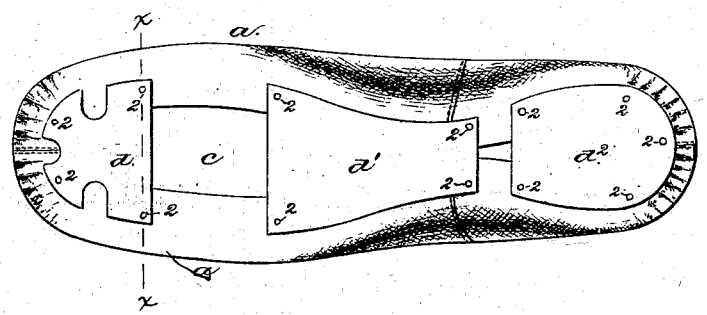

(No Model.)

M. BROCK.
LASTING BOOTS AND SHOES.

No. 284,174. Patented Sept. 4, 1883.

Witnesses.
John F. C. Prinkert
Fred A. Powell

Inventor.
Matthias Brock
by Crosby Gregory
attys.

UNITED STATES PATENT OFFICE.

MATTHIAS BROCK, OF BOSTON, MASSACHUSETTS, ASSIGNOR TO THE McKAY AND COPELAND LASTING MACHINE COMPANY, OF PORTLAND, MAINE.

LASTING BOOTS AND SHOES.

SPECIFICATION forming part of Letters Patent No. 284,174, dated September 4, 1883.

Application filed June 30, 1883. (No model.)

*To all whom it may concern:*

Be it known that I, MATTHIAS BROCK, of Boston, county of Suffolk, State of Massachusetts, have invented an Improvement in Method of Lasting Boots and Shoes, of which the following description, in connection with the accompanying drawings, is a specification, like letters on the drawings representing like parts.

This invention in lasting boots and shoes is an improvement on the invention described in United States Patent No. 136,476, and has for its object to perfect the invention therein described and enable the use of cement in a rapid and economical manner. That patent describes that the union of the upper and inner sole for the purposes of lasting might be accomplished by cement alone applied to what I shall call a "binder" or "lasting-piece;" but the operation of lasting, as therein described, must necessarily be and is very slow, and in practice it requires such an expenditure of time as to make the use of cement almost impracticable in a commercial sense, for any lasting process, to be successful and valuable, must be capable of being practiced mostly mechanically and without waste of time. No cement now known is capable of instantly adhering to leather with sufficient tenacity to completely overcome the reactionary strain due to the elastic and refractory nature of much of the leather used in boots and shoes.

It is the purpose of this invention to apply to the upper and sole means to hold the same positively while the cement has an opportunity to set, thus enabling the usual mechanically-operated lasting appliances which act to draw and fit the upper to the last to be withdrawn quickly after having laid the upper over on the inner sole, such means supplementing the adhesive strength of the cement or other adhesive substance used, thereby obviating the loss of time required for the said cement or adhesive substance to get dry or cool and set. The effective strength of the cement is herein augmented by instantly inserting nails or pegs through the binders or lasting-pieces and into the upper and inner sole just as the binder, with cement applied between it and the upper, is forced against the upper, then drawn over the inner sole on the last. The binders employed will be preferably of leather, although leather-board and other similar material—such as thin but strong pasteboard—may be used, the binders being of such size as to more or less cover the bottom of the shoe after the upper has been drawn about the edges of the inner sole, and in one or more pieces, it being only necessary that the binders be applied to the shoe at the points or places where the upper will be subjected to its greatest strain, the binders being of such thickness as to hold with sufficient firmness the fastenings—nails or pegs—inserted therein. The nails or pegs employed as holding means to prevent the upper springing back may be partially inserted into the binders before they are applied to the upper and to the inner sole, and the face of the binder to be placed in contact with the upper may be provided with cement at any desired time before applying the binder. These binders or lasting-pieces should be struck down upon the upper and inner sole to be lasted, while the upper is held in place by suitable jaws or fingers of a lasting-machine, and with sufficient force to bring the same into close contact with the upper and inner sole of the shoe to be lasted, cement having been applied between the parts, and at the same time the nails or fastenings held by the binder will all be driven simultaneously by a broad metal plate; but it is obvious that equally certain results may be obtained by introducing or applying the cement just as the parts are to be forced together, the nails being driven immediately thereafter and one at a time.

Figure 2:
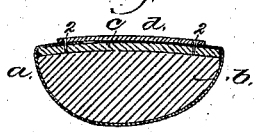
Figure 3:
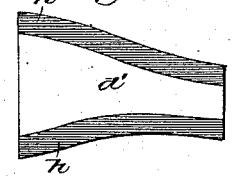

Figure 1 represents the bottom of a shoe lasted in accordance with this invention; Fig. 2, a cross-section thereof on the dotted line $x$ $x$, and Fig. 3 an under side view of one of the binders or lasting-pieces.

In the drawings, $a$ represents the upper drawn over the last $b$, and the inner sole, $c$, thereon, and $d$ $d'$ $d^2$ represent the binders or lasting-pieces, of leather or leather-board. The material composing the upper of the boot or shoe will be forced, pulled, or drawn about the last and laid over upon the inner sole thereon by any of the usual lasting-machines having jaws or upper-engaging devices or appliances, and while the said upper is held against the last and the inner sole I apply to the turned-over portions of the upper the binders $d\ d'\ d^2$, each composed, as herein shown, of leather-board provided or coated at its under side about its edges with a suitable strong cement, as shown at $h$, Fig. 3, such as used in connection with leather-work. These binders so prepared are then pressed down upon the edges of the upper and inner sole, and preferably at the same time and by one large metal plate the few fastenings 2, which are used, will be driven through the binders into the upper and into the inner sole, so that as the cement on the binders, which cement is designed to be the chief holding means by which to retain the upper and inner sole in lasted condition, "takes hold," as it is called, the said upper cannot slip back, as it would do on the release of the upper, before the cement fully hardened and set, were it not for the said fastenings. If the operator has to wait for the cement to set, the time so lost both of himself and the machine is sufficient to render the use of cement alone impracticable, commercially speaking; but by driving a limited number of fastenings immediately upon or immediately after, causing the cement between the binders and upper to act, and driving them, as shown in the drawings, and only at the points of greatest strain, it is possible to release the jaws of the lasting-machine immediately after the cemented surfaces are placed together, which is one of the main features whereby my invention is made valuable, the fastenings augmenting the power of the cement, so that notwithstanding the same is yet wet and not fully set, the upper will be held with sufficient power to prevent its slipping.

I am aware that cement and nails, rivets, and pegs have been variously used, but do not know that the introduction of the same has before my invention been made an integral part of a cementing process to accomplish the purpose described.

A machine for automatically practicing this method of lasting will form the subject of another application.

In Fig. 1 the binder or lasting-piece $d$ is cut out or notched to permit the upper holding or engaging device of a lasting-machine such as represented in United States Patent No. 209,233, and marked B, to remain in engagement with and hold the upper and inner sole closely together while the said binder is pressed down to cause it to be stuck to the upper and to the inner sole and to be nailed in place. The pieces $d'\ d^2$ may be cut away in like manner.

I claim—

1. That improvement in the method or process of lasting boots and shoes which consists in joining the edges of the upper laid or drawn over the inner sole by means of binders, and a cement or adhesive substance applied to the binders and the upper or material of the boot or shoe, and augmenting the power of the said cement or adhesive substance by the insertion of nails or fastenings into the said binders, upper, and inner sole, whereby the lasting operation may be rapidly and economically practiced, substantially as described.

2. The combination of the upper and inner sole with a binder cemented to the upper, and cut away to permit the said binder to be applied to the said upper and inner sole while held by upper-engaging devices of a lasting-machine, the said binder forming a permanent part of the finished shoe, substantially as described.

In testimony whereof I have signed my name to this specification in the presence of two subscribing witnesses.

MATTHIAS BROCK.

Witnesses:
GEO. W. GREGORY,
W. H. SIGSTON.